(12) United States Patent  
Son

(10) Patent No.: US 7,440,773 B2
(45) Date of Patent: Oct. 21, 2008

(54) METHOD FOR PROTECTING USER DATA IN A PERSONAL DIGITAL ASSISTANT (PDA) TELEPHONE

(75) Inventor: Seong-Won Son, Gumi-si (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 531 days.

(21) Appl. No.: 11/034,928

(22) Filed: Jan. 14, 2005

(65) Prior Publication Data

US 2005/0206244 A1    Sep. 22, 2005

(30) Foreign Application Priority Data

Mar. 22, 2004   (KR) ................ 10-2004-0019323

(51) Int. Cl.
  *H04M 1/00*   (2006.01)
  *H04B 1/16*   (2006.01)
  *G11C 5/14*   (2006.01)

(52) U.S. Cl. ............ 455/556.2; 455/574; 455/117; 455/217; 365/226

(58) Field of Classification Search .......... 455/556.1, 455/556.2, 574, 117, 217
See application file for complete search history.

(56) References Cited

U.S. PATENT DOCUMENTS

| 4,777,626 | A | * | 10/1988 | Matsushita et al. | .......... 365/226 |
| 5,375,246 | A | * | 12/1994 | Kimura et al. | .............. 365/229 |
| 5,546,589 | A | * | 8/1996 | Odaira | ....................... 713/340 |
| 6,522,960 | B2 | * | 2/2003 | Nada | ........................... 701/22 |
| 6,999,800 | B2 | * | 2/2006 | Peng et al. | .................. 455/574 |
| 2002/0147037 | A1 | * | 10/2002 | Kwon | ......................... 455/574 |
| 2004/0082362 | A1 | | 4/2004 | Peng et al. | |

FOREIGN PATENT DOCUMENTS

| GB | 2 328 766 | 3/1999 |
| WO | WO 01-69805 A1 | 9/2001 |

* cited by examiner

*Primary Examiner*—Duc M Nguyen
(74) *Attorney, Agent, or Firm*—Roylance, Abrams, Berdo & Goodman, LLP

(57) ABSTRACT

Provided is a method for protecting user data in a PDA telephone having functions of a PDA and a telephone. The method includes checking a voltage of the PDA telephone through a first low voltage sensor when both the PDA and the telephone are in OFF states and prohibiting user's manipulation on the PDA telephone when the voltage of the PDA telephone goes to a first low voltage.

3 Claims, 2 Drawing Sheets

METHOD FOR PROTECTING USER DATA IN A PERSONAL DIGITAL ASSISTANT (PDA) TELEPHONE

PRIORITY

This application claims the benefit under 35 U.S.C. §119(a) of an application entitled "Method for Protecting User Data in a Personal Digital Assistant (PDA) Telephone" filed in the Korean Intellectual Property Office on Mar. 22, 2004 and assigned Serial No. 2004-19323, the entire contents of which are incorporated herein by reference.

BACKGROUND OF THE INVENTION

1. Field of the Invention

The present invention relates generally to a Personal Digital Assistant (PDA) telephone having functions of a PDA and a mobile telephone. In particular, the present invention relates to a method for checking the voltage of the PDA telephone when both the PDA and the telephone are in their OFF states.

2. Description of the Related Art

In a PDA telephone having functions of a PDA and a mobile telephone, since the PDA is the main application, the telephone cannot be used at low voltages (such as, 3.6V), thereby preventing user data stored in a random access memory (RAM) of the PDA from being eliminated due to a voltage drop caused by the mobile telephone. Particularly, in a Global System for Mobile communications (GSM) telephone, a voltage drop that occurs after call connection is significant. The user data stored in a synchronous dynamic RAM (SDRAM) of the PDA must be protected if the telephone function is to be used in low voltage situations.

In the PDA telephone, when both the PDA and the telephone are in their ON states, a controller of the PDA checks the voltage of the PDA telephone. When the voltage of the PDA telephone goes to 3.8V, the controller of the PDA senses a low-battery condition. When the voltage of the PDA telephone goes to 3.6V, the controller of the PDA turns off the telephone. Thereafter, when the voltage of the PDA telephone goes to 3.5V, the controller of the PDA senses a very low-battery condition. When the voltage of the PDA telephone goes to 3.4V, the controller of the PDA turns off the PDA by switching the PDA into a sleep mode. In the sleep mode, user data stored in the RAM of the PDA is automatically refreshed, thereby preventing the user data from being eliminated. In the sleep mode, only the automatic refresh function is enabled, and the PDA functions cannot work. If a user of the PDA telephone inputs a power-on key while both the telephone and the PDA are in their OFF states, the telephone and the PDA enter the ON states. When the PDA is turned off or enters the sleep mode, the controller of the PDA is internally awakened to control the user data stored in the RAM of the PDA to be automatically refreshed, but cannot check the voltage of the PDA telephone any longer. Therefore, after the PDA is turned off, the voltage of the PDA telephone is checked by a second low voltage sensor and the PDA telephone is supplied with a voltage from a secondary chemical battery instead of its main power supply. Once the voltage of the PDA telephone goes to 2.9V, the second low voltage sensor senses a low-battery condition and informs the internally-awakened controller of the PDA of the low-battery condition. Then the controller of the PDA switches the PDA telephone into a battery default mode. At this time, if the user of the PDA telephone inputs a power-on key, the PDA telephone is momentarily turned on and then immediately turned off, thereby preventing the user from using the PDA telephone.

Also, when the PDA is in the ON state and the telephone is in the OFF state, the controller of the PDA checks the voltage of the PDA telephone. When the voltage of the PDA telephone goes to 3.8V, the controller of the PDA senses a low-battery condition. When the voltage of the PDA telephone goes to 3.5V, the controller of the PDA senses a very low-battery condition. When the voltage of the PDA telephone goes to 3.4V, the controller of the PDA turns off the PDA or switches the PDA into the sleep mode. If the user of the PDA telephone inputs a power-on key while both the telephone and the PDA are in the OFF states, the telephone and the PDA enter the ON state. When the PDA is turned off or enters the sleep mode, the controller of the PDA is internally awakened to control user data stored in the RAM of the PDA to be automatically refreshed, but cannot check the voltage of the PDA telephone any longer. Thus, after the PDA is turned off, the voltage of the PDA telephone is checked by the second low voltage sensor and the PDA telephone is supplied with a voltage from the secondary chemical battery instead of its main power supply. Once the voltage of the PDA telephone goes to 2.9V, the second low voltage sensor senses a low-battery condition and informs the internally-signaled controller of the PDA of the low-battery condition. Then the controller of the PDA switches the PDA telephone into a battery default mode. At this time, if the user of the PDA telephone inputs a power-on key, the PDA telephone is momentarily turned on and then immediately turned off, thereby preventing the user from using the PDA telephone.

Also, when the PDA is in the OFF state and the telephone is in the ON state, a controller of the telephone checks the voltage of the PDA telephone. At this time, the PDA is in the OFF state or in the sleep mode, and the internally-awakened controller of the PDA controls user data stored in the RAM of the PDA to be automatically refreshed. When the voltage of the PDA telephone goes to 3.64V, the controller of the telephone awakes the controller of the PDA and generates an alarm that informs the user of the PDA telephone that the voltage of the PDA telephone is low and should be recharged. Thereafter, once the voltage of the PDA telephone goes to 3.6V, the controller of the telephone turns off the telephone. From this time on, the second low voltage sensor checks the voltage of the PDA telephone, and the PDA telephone is supplied with a voltage from the secondary chemical battery instead of the main power supply. When the voltage of the PDA telephone goes to 2.9V, the second low voltage sensor senses a low-battery condition and informs the internally-awakened controller of the PDA of the low-battery condition. Then the controller of the PDA switches the PDA telephone into a battery default mode. At this time, if the user of the PDA telephone inputs a power-on key, the PDA telephone is momentarily turned on and then immediately turned off, thereby preventing the user from using the PDA telephone.

However, when both of the PDA and the telephone are in the OFF states, there is no way to check the voltage of the PDA telephone. In other words, if the user leaves the PDA telephone as it is in a specific situation, the PDA and the telephone are naturally discharged and enter their OFF states. Thereafter, when the user turns on the PDA telephone to use the PDA telephone, the telephone booted by the PDA telephone tries to search for a base station, resulting in a significant voltage drop. Thus, the controller of the PDA naturally generates a hardware reset, resulting in a situation where the user data stored in the SDRAM may be eliminated.

SUMMARY OF THE INVENTION

It is, therefore, an object of the present invention to provide a method for checking the voltage of a PDA telephone having functions of a PDA and a telephone when both the PDA and the telephone are in OFF states.

It is another object of the present invention to provide a method for preventing user data stored in a RAM from being eliminated due discharge of battery voltage when to user's power-on key input in a PDA telephone having functions of a PDA and a telephone when both the PDA and the telephone are in OFF states.

To achieve the above and other objects, there is provided a method for protecting user data in a PDA telephone having functions of a PDA and a telephone. The method includes checking a voltage of the PDA telephone through a first low voltage sensor when both the PDA and the telephone are in OFF states and prohibiting user's manipulation on the PDA telephone when the voltage of the PDA telephone is detected to be a first low voltage.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
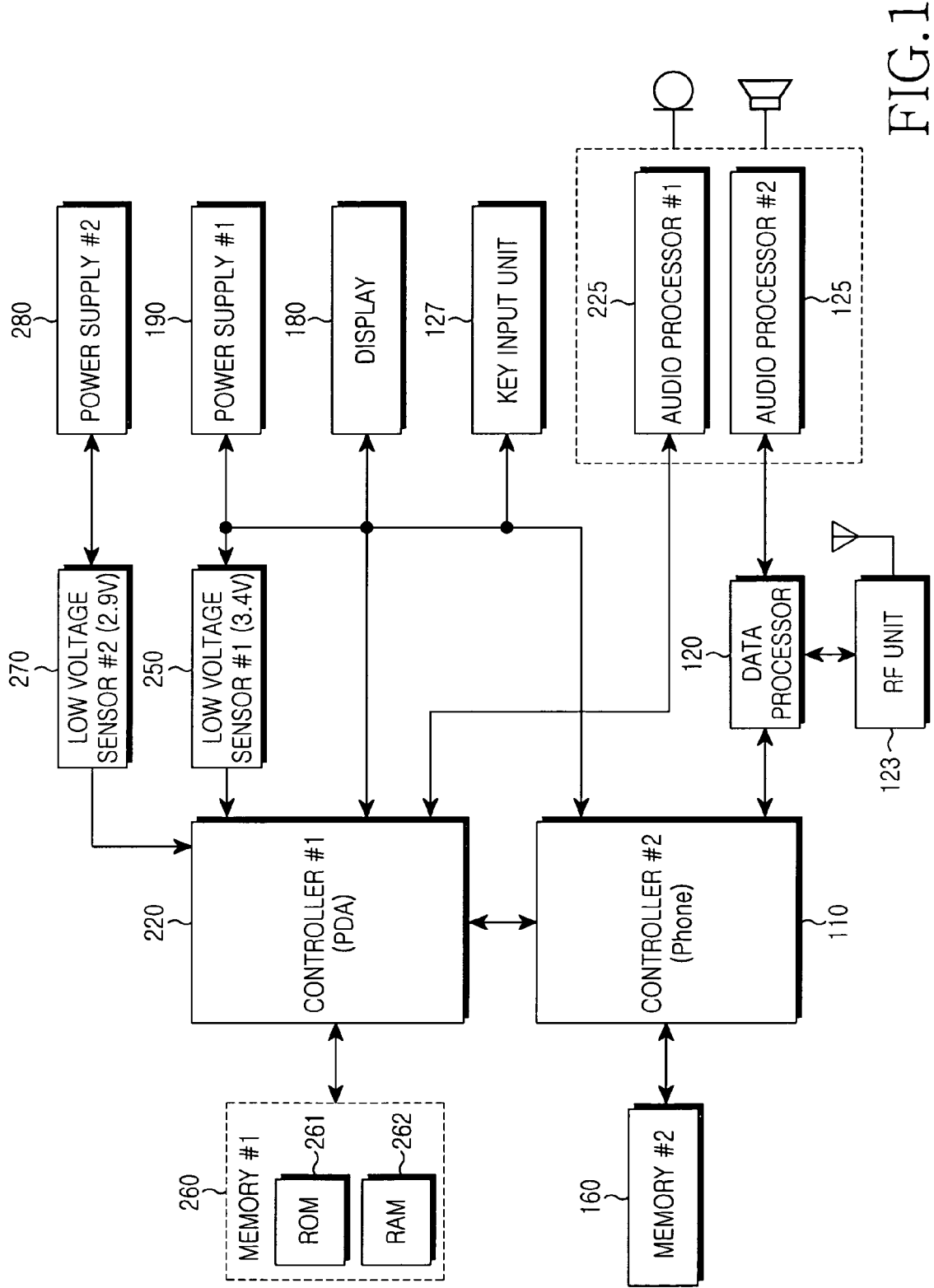
FIG. 1 is a block diagram of a PDA telephone having functions of a PDA and a telephone according to an embodiment of the present invention.

A preferred embodiment of the present invention will now be described in detail with reference to the annexed drawings. In the drawings, it is understood that the same or similar elements are denoted by the same reference numerals even though they are depicted in different drawings. In the following description, a detailed description of known functions and configurations incorporated herein has been omitted for conciseness.

FIG. 1 is a block diagram of a PDA telephone having functions of a PDA and a telephone according to an embodiment of the present invention.

Referring to FIG. 1, a first controller 220 controls the overall operation of the PDA telephone having functions a PDA and a telephone. Also, when both the PDA and the telephone are in the ON states or when the PDA is in the ON state and the telephone is in the OFF state, the first controller 220 checks the voltage of a first power supply 190, which is the main power supply. When the PDA is in the ON state and the telephone is in the ON state, if the voltage of PDA telephone reaches a low-voltage value such that the telephone should be turned off, a second controller 110 that is a controller of the telephone turns off the telephone. Also, when both the PDA and the telephone are in the ON states or when the PDA is in the ON state and the telephone is in the OFF state, if the voltage of the first power supply 190 discharges to the low-voltage value, the first controller 220 turns off the PDA by switching the PDA into a sleep mode to automatically refresh a RAM 262 in which user data is stored. Once the PDA is turned off by entering the sleep mode, the first controller 220 is internally signaled to automatically refresh the RAM 262 in which the user data is stored. Also, when both the PDA and the telephone are in the ON states or when the PDA is in the ON state and the telephone is in the OFF state, after the PDA is turned off, the first controller 220 receives a signal from a second low voltage sensor 270 indicating the PDA telephone is at a second low voltage that checks a voltage of a second power supply 280 that supplies a voltage to the PDA telephone. Upon receiving the signal indicating the PDA telephone is at the second low voltage from the second low voltage sensor 270, the first controller 220 switches the PDA telephone into a battery default mode. When the PDA telephone is in the battery default mode, if the user inputs a power-on key, the PDA telephone is momentarily turned on and then immediately turned off, thereby preventing the use of the PDA telephone.

Also, when both the PDA and the telephone are in their OFF states in which the first controller 220 is internally signaled to automatically refresh the RAM 262, once the first controller 220 receives a signal indicating the PDA telephone is at a first low voltage from a first low voltage sensor 250, the first controller 220 maintains the PDA and the telephone in their OFF states even when the user of the PDA telephone inputs the power-on key. Also, when both the PDA and the telephone are in their OFF states, once the PDA telephone goes to the second low voltage, the first controller 220 receives a signal indicating the PDA telephone is at the second low voltage from the second low voltage sensor 270 and switches the PDA telephone into the battery default mode.

The first low voltage sensor 250 checks the voltage of the first power supply 190 when both the PDA and the telephone are in the OFF states. When the voltage of the first power supply 190 goes to the first low voltage, the first low voltage sensor 250 senses a low-battery condition and transmits a signal indicating the low-battery condition to the first controller 220.

When both the PDA and the telephone are in their ON states or when the PDA is in the ON state and the telephone is in the OFF state, and vice versa, if both the telephone and the PDA are turned off, the second low voltage sensor 270 checks the voltage of the second power supply 280 that supplies the voltage to the PDA telephone. When the voltage of the PDA telephone goes to the second low voltage, the second low voltage sensor 270 transmits a signal indicating a low-battery condition to the first controller 220. Also, when both the PDA and the telephone are in their OFF states, if the voltage of the PDA telephone goes to the second low voltage, the second low voltage sensor 270 checks the voltage of the second power supply 280 that supplies a voltage to the PDA telephone. When the voltage of the PDA telephone goes to the second low voltage, the second low voltage sensor 270 transmits a signal indicating a low-battery condition to the first controller 220. The second power supply 280 may be a secondary chemical battery or a similar power source.

A first memory 260 is comprised of a ROM 261 and the RAM 262. The ROM 261 preferably stores programs for controlling the overall operation of the PDA telephone. The RAM 262 preferably stores user data such as MP3, telephone books, or pictures. Also, when the PDA is turned off or enters the sleep mode, the RAM 262 is automatically refreshed under the control of the internally-signaled first controller 220 to prevent the user data stored in the RAM 262 from being eliminated.

The second controller 110 controls the overall operation of the telephone for calls. Also, the second controller 110 may include a data processor 120. The second controller 110 checks the voltage of the first power supply 190 when the PDA is in the OFF state or the sleep mode and the telephone is in the OFF state. Once the voltage of the first power supply 190 reaches a voltage value at which the telephone should be turned off, the second controller 110 senses a low-battery condition and turns off the telephone.

A radio frequency (RF) unit 123 performs radio communication of the telephone. The RF unit 123 comprises an RF transmitter for up-converting a frequency of a transmission signal and amplifying the up-converted transmission signal and an RF receiver for low-noise-amplifying a received signal and down-converting a frequency of the low-noise-amplified signal. The data processor 120 comprises a transmitter for encoding and modulating the transmission signal and a receiver for demodulating and decoding the received signal. In other words, the data processor 120 can be comprised of a modem and a codec. The codec comprises a data codec for processing packet data and an audio codec for processing audio signals like voice.

In a communication mode of the telephone, a second audio processor 125 reproduces a reception audio signal output from the audio codec of the data processor 120 or transmits a transmission audio signal generated from a microphone to the audio codec of the data processor 120.

In a PDA-using mode, a first audio processor 225 reproduces an audio signal stored in the first memory 260 of the PDA through a speaker or transmits an audio signal generated from a microphone to the first controller 220. Herein, the first controller 220 may comprise an audio codec.

A second memory 160 is comprised of program memories and data memories. The second memory 160 may store programs for controlling the operation of the telephone and data for booting of the telephone.

A display 180 displays the audio signal output to the first controller 220 and the user data on a screen and displays call-related data output from the second controller 110. Here, the display 180 may be a liquid crystal display (LCD), and if so, the display 180 may comprise an LCD controller, a memory that can store video data, and an LCD display device. Here, when the LCD is implemented with a touch screen, it may also serve as an input unit. A key input unit 127 comprises keys for inputting number and character information and function keys for setting various functions.

An operation of the PDA telephone will be described with reference to FIG. 1. In the PDA-using mode of the PDA telephone, the user can search for and modify data stored in the RAM 262 under the control of the first controller 220. Also, the user can use various functions like listening to MP3 files stored in the first memory 260. For sending a call, once the user dials and sets a calling mode through the key input unit 127 in a calling mode of the PDA telephone, the second controller 110, upon sensing the user's manipulation and dial information received through the data processor 120, converts the processed dial information into an RF signal through the RF unit 123. Thereafter, once a called subscriber generates a response signal, the RF unit 123 and the data processor 120 sense the response signal. The user then communicates with the called party using a speech path formed through the second audio processor 125. Also, in an incoming mode, the second controller 110 senses setting of the incoming call mode through the data processor 120 and generates a ring signal through the second audio processor 125. Upon receiving a response from the user, the second controller 110 allows the user to communicate with the calling party using the speech path formed through the audio second processor 125. In the calling and incoming modes, speech communication has been taken as an example, but data communication for packet data and video data may also be performed. Also, in a waiting mode or a character communication mode, the second controller 110 displays character data processed by the data processor 120 on the display 180.

Figure 2:
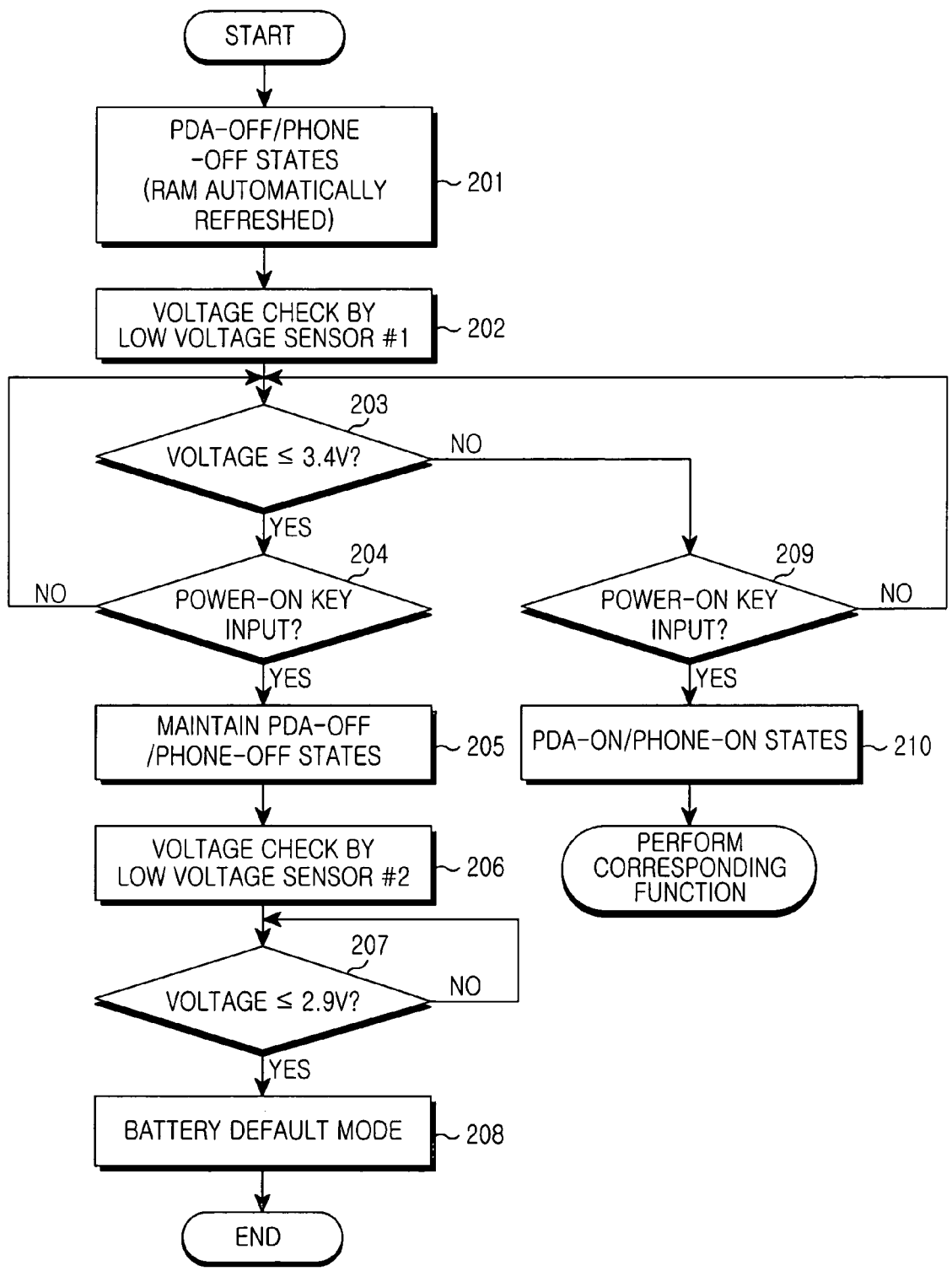
FIG. 2 is a flowchart illustrating a method for protecting user data in a PDA telephone having functions of a PDA and a telephone when both the PDA and the telephone are in OFF states.

FIG. 2 is a flowchart illustrating an embodiment of a method for protecting user data in a PDA telephone having functions of a PDA and a telephone when both the PDA and the telephone are in their OFF states. It will be assumed herein that the first low voltage is 3.4V and the second low voltage is 2.9V.

Hereinafter, the embodiment of the present invention will be described in detail with reference to FIGS. 1 and 2.

Referring to FIG. 2, in step 201 where both the PDA and the telephone are in their OFF states, the first low voltage sensor 250 proceeds to step 202 where it checks the voltage of the first power supply 190. The OFF state of the PDA indicates the sleep mode in which the first controller 220 is internally signaled and automatically refreshes the RAM 262 in which the user data is stored. When the voltage of the first power supply 190 goes to the first low voltage, such as 3.4V, the first low voltage sensor 250 senses a low-battery condition and transmits a signal indicating the low-battery condition to the internally-signaled first controller 220 in step 203. Upon receiving the signal indicating the voltage of the PDA telephone reaches the first low voltage, such as 3.4V, from the first low voltage sensor 250, the first controller 220 prevents the PDA telephone from being turned on by the user's key manipulation. If the user of the PDA telephone inputs a power-on key, the first controller 220 senses, in step 204, the user's power-on key input and maintains the OFF states of the PDA and the telephone in step 205, thereby preventing the PDA telephone from being turning on. When the voltage of the PDA telephone is the first low voltage, such as 3.4V, the second power supply 280 supplies a power supply voltage to the PDA telephone and the second low voltage sensor 270 checks the voltage of the second power supply 280 in step 206. When the voltage of the PDA reaches the second low voltage, such as 2.9V, the second low voltage sensor 270 senses a low-battery condition and transmits a signal indicating the low-battery condition to the internally-signaled first controller 220 in step 207. Upon receiving the signal indicating the voltage of the PDA telephone has reached the second low voltage, such as 2.9V, from the second low voltage sensor 270, the first controller 220 proceeds to step 208 where it switches the PDA telephone into the battery default mode.

If the user inputs the power-on key in a state where the voltage of the PDA telephone is not the first low voltage, such as 3.4V, while the first low voltage sensor 250 is checking the voltage of the first power supply 190 in step 202, the first controller 220 senses the user's power-on key input in step 209, and proceeds to step 210. In step 210, the first controller 220 turns on the PDA telephone to switch the PDA and the telephone into the ON states.

As can be understood from the foregoing description, the PDA telephone according to an embodiment of the present invention has low voltage sensors to check its voltage even when both the PDA and the telephone are in the OFF states. Thus, the PDA telephone can prevent user data stored in a RAM from being eliminated due to a voltage drop caused by a user's power-on key input when both the PDA and the telephone are in the OFF states.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for protecting user data in a Personal Digital Assistant (PDA) telephone having functions of a PDA and a telephone, the method comprising the steps of:

checking a voltage of the PDA telephone through a first low voltage sensor when both the PDA and the telephone are in OFF states;

prohibiting user's manipulation of the PDA telephone when the voltage of the PDA telephone goes to a first low voltage;

checking the voltage of the PDA telephone through a second low voltage sensor when the PDA telephone is detected to have the first low voltage; and switching the PDA telephone into a battery default mode when the voltage of the PDA telephone reaches the second low voltage.

2. The method of claim 1, wherein in the OFF state of the PDA, the PDA is switched into a sleep mode to automatically refresh a random access memory (RAM) in which the user data is stored.

3. The method of claim 1, wherein when the voltage of the PDA telephone reaches the first low voltage, the PDA telephone maintains an OFF state of the PDA and the telephone even when the user inputs a power-on command.

* * * * *